INVENTOR.
ERIC ARVID ERICSSON
BY Hane and Nydick
ATTORNEYS

INVENTOR.
ERIC ARVID ERICSSON
BY Hane and Nydick
ATTORNEYS

United States Patent Office 3,211,838

Patented Oct. 12, 1965

3,211,838
TRAFFIC BETWEEN PRIVATE AUTOMATIC BRANCH TELEPHONE EXCHANGES

Eric Arvid Ericsson, Stockholm, Sweden, assignor to Telefonaktiebolaget L M Ericsson, Stockholm, Sweden, a corporation of Sweden Filed Apr. 9, 1962, Ser. No. 185,905
Claims priority, application Sweden, Apr. 27, 1961, 4,416/61
3 Claims. (Cl. 179—27)

The present invention relates to private automatic branch telephone exchanges connected to a public telephone network with one subscriber's number for each private branch exchange. The purpose of the invention is to facilitate traffic between a number of private branch exchanges having considerable mutual interconnection traffic and to provide a local numbering range that is common to said exchanges, which numbering range is to be used for traffic within said private automatic branch exchanges as well as between these exchanges.

If an enterprise has several private branch exchanges, these exchanges are customarily connected individually to the public telephone network but they are interconnected mutually with direct junction lines intended for internal traffic so that a private group of rural telephone networks is formed. Owing to this it is achieved that the internal traffic need not pass an operator and that, if so is desired, a manual board that is common to the incoming external traffic can be arranged for the whole enterprise. Furthermore, it is achieved that restricted extensions can connect local calls between the exchanges fully automatically. The cost for junction lines becomes however considerable and if the distance between the private branch exchanges is great or if the branch exchanges are connected to different telephone exchanges in the public telephone network it is not possible to connect all incoming traffic at a reasonable cost through a common manual board. Incoming as well as outgoing external traffic must then be arranged individually for each private branch exchange and direct junction lines for internal traffic between the exchanges is usually altogether out of the question.

The invention has for a purpose to be able to connect calls—without the use of direct lines between private branch exchanges with interconnection traffic—between the exchanges from all extensions, also from those which are closed for calls to the public telephone network, and to introduce telephone numbers that are included in a local numbering range with open or closed direction digits and are shorter than the telephone numbers in the public telephone network. This is achieved by the aid of arrangements in each of the private branch exchanges, which arrangements comprise registers for registration of a local number corresponding to a line pertaining to another private branch exchange, by a translating means for translating said local number into a subscriber's number in the public network that indicates the called other private branch exchange, and by the aid of a number sender for sending said subscriber's number to the public network accompanied by said local number for automatic connection of calls from lines connected to the first mentioned private branch exchange to lines connected to the other private branch exchange.

The invention will be described more closely below by means of drawings.

Figure 1:
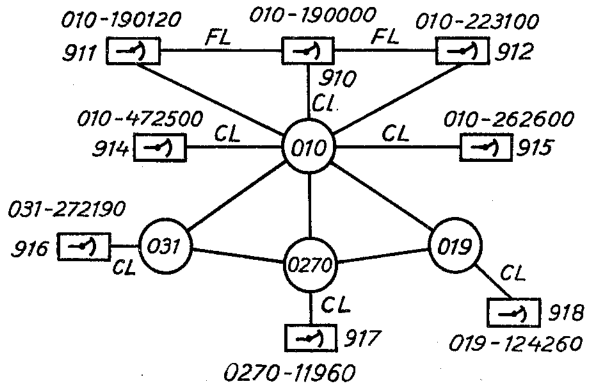
FIG. 1 shows diagrammatically part of a public network including a group of private automatic branch exchanges each having a common private numbering range.

FIG. 1 shows a public telephone network comprising 4 public telephone exchanges having the routing numbers 010, 019, 031 resp. 0270. A group of 8 private branch exchanges with interconnection traffic is connected to the telephone network, 5 private branch exchanges being connected to the telephone exchange 010 and one to each of the three telephone exchanges 019, 031 and 0270. The telephone exchanges 010, 019 and 031 have six-digit subscriber's numbers and the telephone exchange 0270 has five-digit subscriber's numbers. For calls within each of the public telephone exchanges only the subscriber's number is used while calls between the telephone exchanges in the public telephone network must use the routing number for the telephone exchange plus the subscriber's number which implies that nine digits are required. The private branch exchanges have each its own subscriber's number, namely 190000, 190120, 223100, 262600 respectively 472500 for those which are connected to telephone exchange 010, and 124260 respectively 272190 and 11960 for those which are connected to the telephone exchanges 019, 031 respectively 0270. Between the private branch exchanges 190000, 190120 and 223100 direct lines FL are provided which are reached by means of local routing numbers 910, 911 respectively 1912. Otherwise there exist only the exchange lines CL arranged between the private branch exchanges and respective telephone exchange in the public telephone network.

The extensions within the private branch exchanges have local numbers with 2, 3 or 4 digits dependent on the size of the exchange. For calls to the public network the direction digit 0 is used followed by a new dialling tone. Restricted extensions receive busy tone upon a call to the direction digit 0. Furthermore there are provided in this case three-digit routing numbers 910–918 for private branch exchanges with interconnection traffic as appears from FIG. 1. If we suppose that the private branch exchange 010–190120 has three-digit local numbers and is to be called from one of the exchanges having interconnection traffic, six digits will be required according to the invention, viz. 911 plus a three-digit local number instead of 7 to 10 digits plus aid by a manual operator in the called private branch exchange. With shorter routing numbers fewer digits are required. Of course the same call can always be carried out from not restricted extensions by means of the digits 0(10)–190120 by utilizing a PBX-operator. The invention has however for a purpose—among other things—to disencumber the PBX-operators of calls between the private branch exchanges with interconnection traffic.

Figure 2:
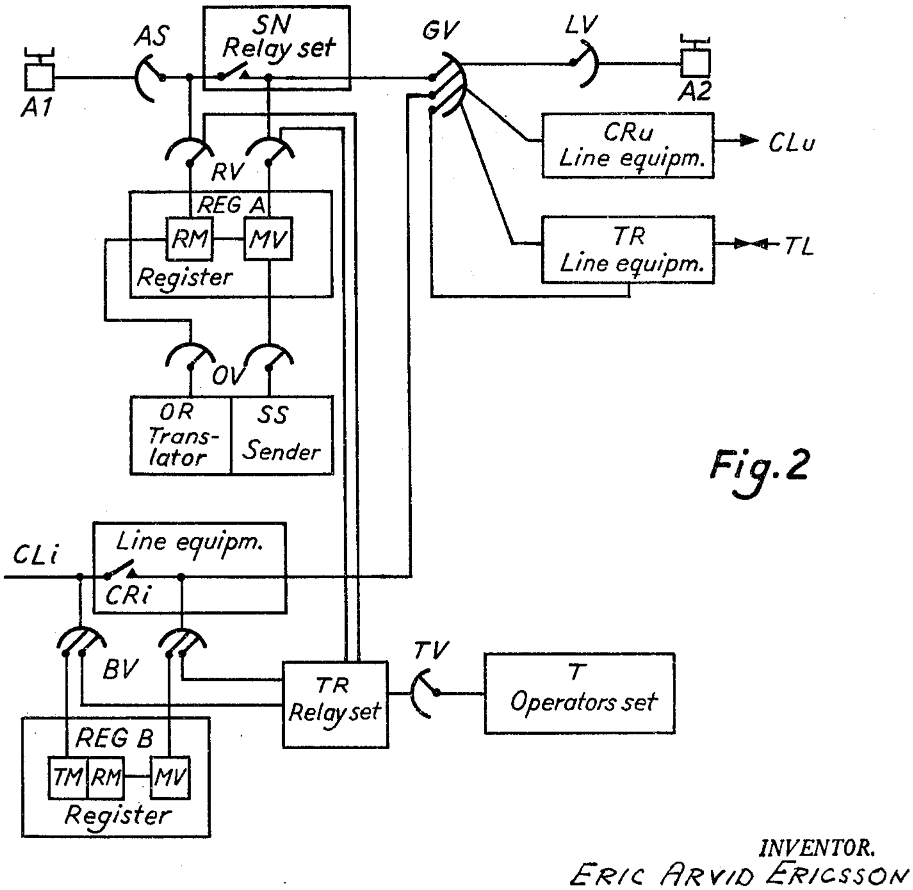
FIGS. 2 and 3 show trunking arrangements in one of the private automatic branch exchanges.

FIG. 2 shows diagrammatically a private branch exchange designed according to the invention. In the FIGURE A1 and A2 designate two extension instruments. The private branch exchange contains link circuits comprising each a relay set SN, a line finder AS and a group selector GV. Furthermore there are line selectors LV, register selectors RV and registers REGA for the internal and outgoing traffic of the private branch exchange. For the traffic outgoing from the exchange, exchange lines CL*u* are provided having each its own line equipment CR*u* and for the traffic coming to the exchange, exchange lines CL*i* are provided having each its own line equipment CR*i*. For the traffic to or from a private branch exchange with interconnection traffic, junction lines FL are provided having each its own line equipment FR intended for two-way traffic.

For direct interworking between private branch exchanges with considerable mutual interconnection traffic, to which there are no direct junction lines FL, translators CR and number senders SS have been arranged which by means of selectors OV are connected to the registers REGA, and special registers REGB which by the aid of a selecting means BV are connected to the line equipments CR*i* of the incoming exchange lines. Through the selecting means BV the incoming exchange lines CL*i* are connected alternatively to relay sets TR which in their turn through selectors TV are connected to an operator's equipment T.

The registers REGA as well as the registers REGB contain a registering means RM and a control device MV for the setting of the selectors GV and LV. In the registers REGB is furthermore comprised a signal receiver TM, for example, a voice frequency signal receiver for receipt of signals from the lines CL*i*. The registers REGA receive signals from the extension instruments in known manner, for example dial impulses which are supposed to operate an impulse relay pertaining to the registering means RM.

A call from the instrument A1 is connected through a line finder AS and a register selector RV to the registering means RM in a register REGA that emits a dialing tone. At the same time the control device MV of the register is connected through the same register selector RV to the group selector GV. The registering means RM is set by impulses from the dial of the instrument A1.

If the call is intended for an internal communication, for example to the instrument A2, the control device MV that sets the selectors GV and LV, will be operated, whereupon the register REGA will be released and the communication will be connected through the relay set SN. If the call is meant for an extension in a private branch exchange with interconnection traffic, to which direct lines FL are provided, the communication will be connected by the register REGA in an analogous manner by setting the group selector GV on a free line FL, after which the incoming group selector GV and a line selector LV in the calling private branch exchange are set by means of signals through the line FL and its line equipments FR.

If the call is directed to a subscriber in the public telephone network, the group selector GV is set on a free, outgoing exchange line CL*u*, the register REGA is released and the subscriber will be connected to a register in the public network and receives a new dialing tone. Digit signals will then be sent from the instrument A1 through the line finder AS, relay set SN, group selector GV, line equipment CR*u* and the line CL*u* to the public telephone network in which the telephone connection is established.

If the call is directed to an extension in a private branch exchange having interconnection traffic, to which exchange there are no direct lines, and a local routing number accompanied by an extension number in the called PBX-exchange is registered in the register REGA, the register will connect itself to a translating means OR through a selector OV which simultaneously connects the number SS to the control device MV of the register. The registration in the registering means RM is transmitted to the translator OR simultaneously with the group selector GV being set on a free outgoing exchange line CL*u*, through which the telephone exchange of the public network is called. A register in the public telephone exchange is connected and a signal is sent from said register to the calling number sender SS. This signal may consist in the direction of current in the exchange line being reversed or only in a dialing tone being sent out to indicate that the digit transmission can begin. By means of a voice frequency signal receiver arranged in the number sender SS the buzzer signal can be received.

The local routing number of the called private branch exchange is translated in OR into the public subscriber's number of the same exchange. The call emanates for example from the private branch exchange 911 in FIG. 1 and one of the exchanges 912 or 918 is called. The routing number 912 is then translated into 223100 and the routing number 918 is translated into 019–124260. A connection is then set up through the public network between the calling outgoing exchange and an incoming exchange line CL*i* pertaining to the called exchange. The call is answered so, that the ringing signal is interrupted and a communication is obtained.

In the called private branch exchange a register REGB is connected through a register selector BV which simultaneously with a voice frequency signal receiver TM being connected to the exchange line CL*i*, connects the control relay set MV of the register to the group selector GV of the exchange line.

The number sender SS is presupposed to send the subscriber's number of the called exchange through impulse trains in correspondence to the digit transmission from a dial. Immediately after this the number sender SS starts the sending out of the local number of the called extension, the digits however being sent as voice frequency combinations. Change between the voice frequency combinations of the digits occurs through voice frequency signals sent in backward direction from the register REGB of the called exchange. When the voice frequency receiver TM is connected to the exchange line CL*i*, a voice frequency signal corresponding to the first digit in the local subscriber's number should of course be connected to the connection. This voice frequency signal is received and registered in RM in REGB and is answered by a voice frequency signal sent in backward direction which is received in SS in the calling exchange, whereby the voice frequency signal of the first digit is interrupted and the voice frequency combination of the second digit is connected after a short interruption. In this manner the number of the called extension is transmitted to REGB, after which the register REGA will be released. The register REGB sets the selectors GV and LV in the called exchange, after which REGB is released and the connection is completed through the line equipment CR*i*.

Not only calls from private branch exchanges with interconnection traffic come to the exchange line CL*i* but also calls from other subscribers within the public telephone network. These calls occasion connection of a register REGB but since no voice frequency combination corresponding to a digit is connected to the exchange, the voice frequency receiver TM and the registering means RM will not be operated. The register REGB tests instantaneously when being connected whether there is a voice frequency signal on the exchange line CL*i* or not, or, if so is not the case the call will be switched to a relay set TR, the exchange line then being marked from the register REGB. After this the register REGB will be released and a free operator's position T is connected through its selector TV, the relay set TR and the selector BV to the exchange line. The operator answers the call and transmits a communication to that extension which is intended. The relay set TR is then connected to a register REGA through a selector RV. The operator sets the register and then the control relay set MV in REGA sets the selectors GV and LV by means of signals through RV, TR and BV.

The line equipments CR*i* must of course be adapted to the construction of the public telephone network. Thus a ringing signal from the public network must be interrupted by an answering signal from CR*i* or REGB. This answering signal may usually be carried out so, that only the ringing is interrupted while answering signal for call metering is avoided and will not be sent before the called extension answers. A connection for interrupting the ringing so that the voice frequency signals reach REGB without simultaneously obtaining call metering is shown in the enclosed FIGURE 4 as will be described below.

Figure 3:
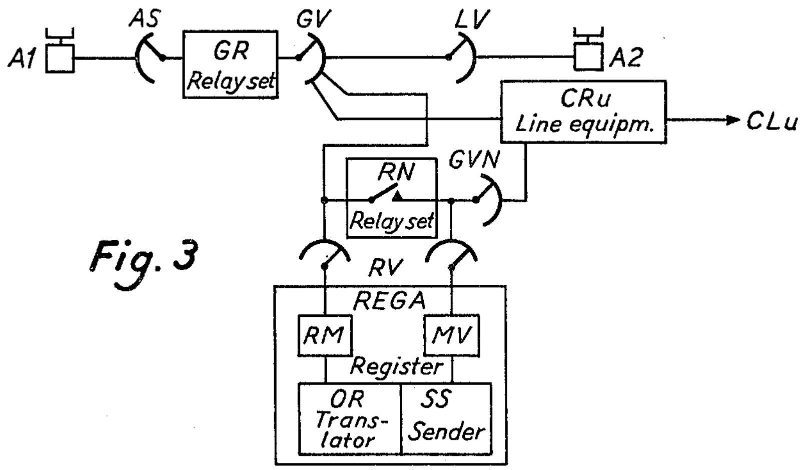

The arrangements for outgoing traffic must be adapted to the construction of the exchange. In FIG. 3 is shown how the circuit arrangements according to the invention are arranged when the private branch exchange is built with selectors that are controlled directly from the dials of the extensions. The exchange lines CL can be reached on one hand directly from the group selectors GV, on the other hand via links RN with auxiliary selectors GVN. The links RN are connected to registers REGA through register selectors RV. Each register REGA contains registering means RM and control means MV and a translator OR and a signal sender SS.

A call from the instrument A1 is connected through a line finder AS to a relay set GR and a group selector GV. Dialling tone is sent from GR, and impulse trains from A1 are then repeated by an impulse relay in GR. Then the group selector GV is set and at internal communications also a line selector LV. If the direction digit 0 is dialled, GV will be set directly to an exchange line CL and its line equipment CR*u*. A new dialling tone is obtained from the public telephone network whereupon impulse trains from the dial of the instrument A1 are emitted to the public network.

If the direction digit 9 is dialled, the group selector GV will be set to a link RN and through a register selector RV to a register REGA. If it is not desired to await a new dialling tone after the direction digit 9, the selection of a free link RN can be made dependent on the fact that the link in non-operated condition is connected to a free register REGA, or the register selector RV will be designed as very quickly operating relay selector.

The subsequent digits are registered sequentially by the registering means RM in the register REGA. The routing number of the called private branch exchange for example 912, is translated in OR into the corresponding subscriber's number in the public telephone network. Simultaneously the selector GVN is set by the control means MV to a free exchange line CL. After receiving answer signal, for example a dialling tone, from the public telephone network, the signal sender SS will first send said subscriber's number and then the local number of the called extension, and thereafter the register REG will be released.

Figure 4:
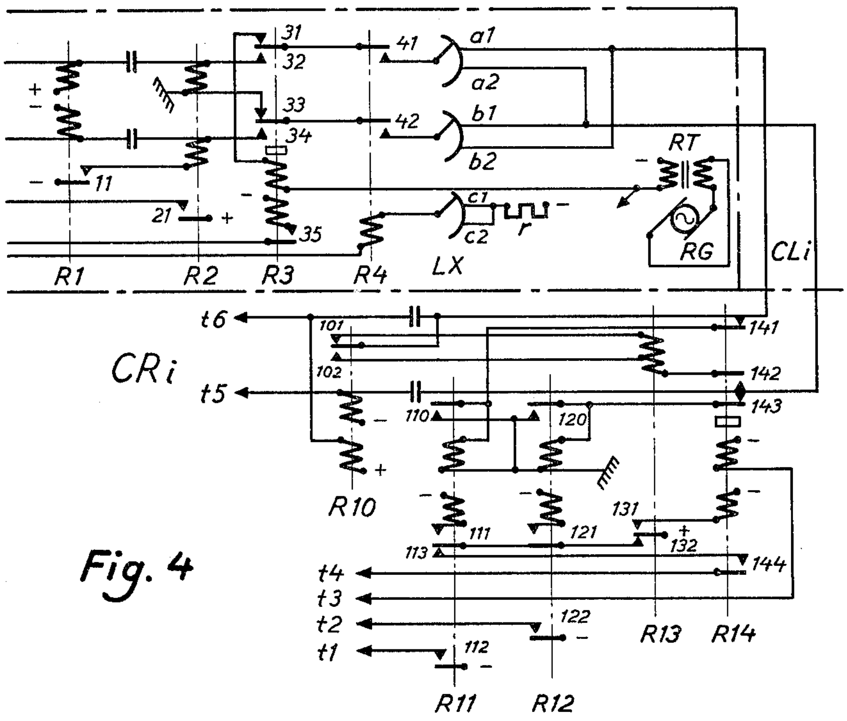
FIG. 4 shows a circuit diagram for ringing with two different types of ring signals from a public exchange to a private automatic branch exchange.

FIG. 4 shows a manner of separating at incoming traffic to a private branch exchange those calls which come from private branch exchanges with interconnection traffic in the public network. For this purpose the private branch exchange has two subscriber's numbers in the public network and each of the exchange lines is connected to two multiple positions in the line selector multiple of the public telephone exchange in such a manner, that the talking wires are connected to one of these multiple positions with the line branches crossed in relation to the other multiple position. In the line equipments of the incoming exchange lines for each talking wire a relay for the receiving of ringing signal exists and upon a call to one of the two multiple positions one of said ringing signal-receiving relays is operated which causes connection of the call to the operator of the private branch exchange, while calls to the other multiple position prepare the line equipment of the exchange line for automatic connection of the call right to the called extension line.

In FIG. 4 CL*i* is an exchange line having a line equipment for incoming traffic. Only those relays R10–R14 which are essential for the receipt of signals are shown in the figure. In the public telephone exchange, line selectors LX are provided each having a relay equipment, of which equipment only those relays R1–R4 which are essential for a calling signal are shown in the figure. The exchange line CL*i* is connected to the multiple of the selectors XL in two multiple positions, viz. $a_1$, $b_1$, $c_1$ and $a_2$, $b_2$, $c_2$. The line selectors LX are supposed to do at least two movements at each call, namely a setting movement, the number of the called exchange being selected, and a finding movement, a free exchange line pertaining to the number being selected. Since there are two subscriber's numbers, there also exist two groups of multiple positions for the finding movement. When the selector LX is occupied, the relay R1 will attract and contact 11 is closed. When the exchange line CL*i* is selected, the selector LX will stop on either of the multiple positions $a_1$, $b_1$, $c_1$ or $a_2$, $b_2$, $c_2$ dependent on which subscriber's number has been chosen. The test relay R4 operates in a circuit through the multiple contact $c_1$ or $c_2$ and the resistance *r*. The contacts 41, 42 are actuated. Ringing signal is sent out from the ring generator RG through the transformer RT, the upper winding on relay R3, contacts 31 and 41, the multiple contact $a_1$ or $a_2$ to the called line. Upon a call to an ordinary subscriber's instrument the circuit is closed through the capacitor and bell of the instrument, multiple contact $b_1$, contacts 142 and 33, to earth.

Upon a call to the exchange line CL*i* a direct current circuit is closed from earth in the line equipment CR*i*, the upper winding on one of the relays R11, R12, contacts 141 and 143, one of the multiple positions $a_1$ or $a_2$, contact 41, contact 31, the upper winding on relay R3, transformer RT, to negative. The relay R11 or R12 operates. The contacts 110–113 or 120–122 are actuated. The upper winding that has a high resistance is short-circuited on that of the relays R11 or R12 which is energized. Then the relay R3 operates and the contacts 31–35 are actuated. The relays R3 and R11 respectively R12 are each held by means of its own auxiliary winding and its own holding contact 35, respectively 111 and 121.

If the relay R11 is energized, the contact 112 is closed and a circuit through the wire *t1* causes connection of a register REGB through its register selector BV in FIG. 2. If the relay R12 is energized, the contact 122 is closed and a circuit through the wire *t2* causes connection of a relay set TR and of an operator's equipment T through selectors BV and TV in FIG. 2. In both these cases the relay R14 operates in a circuit through the wire *t3*. The contacts 141–144 are actuated. The following circuit is completed: earth, the upper winding on relay R2, contacts 32, 41, $a_1$ or $a_2$, line CL*i*, contact 101, the windings on relay R13, contact 142, $b_1$ or $b_2$, contacts 42 and 34, the upper winding on R2, contact 11, to negative. The relay R13, the upper winding of which has a high resistance, is energized. The contacts 131–132 are actuated. That of the relays R11, R12 which has operated, releases its armature.

If the call actuated the relay R11, so that a register REGB is connected, this register can hereafter be set by means of signals through the line CL*i*. These signals can be voice frequency signals as described above or direct current impulses which are sent with the aid of the relay R1. In the latter case the impulses are repeated by the relay R13 that actuated the contact 132, so that a circuit through the contacts 132, 113, 144 and the wire *t4* is closed and interrupted. The wires *t3* and *t4* as well as the talking wires *t5*, *t6* are through the register selector BV connected to the register REGB.

After the register has set up a telephone communication it will be disconnected. The wires *t3* and *t4* become currentless but the relay R14 that is slow releasing will be held by the relay R13 in a circuit through the contact 131. When the called extension answers, the relay R10 will operate. The contacts 101–102 are actuated. The upper winding of the relay R13 that has a high resistance in order to prevent the relay R2 from operation before answer is obtained from the called extension, will be disconnected. The relay R2 operates. The contacts 21 closes a circuit for marking of answer and for call metering.

I claim:

1. In an automatic telephone network, in combination, public automatic telephone exchanges; groups of arbitrarily located private automatic branch exchanges; each of said branch exchanges having a subscriber's number in the numbering range of the public exchanges and each branch exchange further having a private numbering range common to all private branch exchanges in the respective group for traffic within the group; junction lines in said network interconnecting said public exchanges; lines connecting each private branch exchange in a group to a public exchange; registers in each private branch exchange in each group, means in said registers for registration of numbers in said private numbering range; means connected with said registers translating private numbers assigned to another branch or exchange followed by the private number designating the ber of the called private branch exchange in the public numbering range; and transmitter means for sending said subscriber's number to the respective public telephone exchange followed by the private number designating the called line within the called private branch exchange.

2. In a group of private automatic branch exchanges according to claim 1, signal receiving means, and connecting means for the incoming exchange lines in each private branch exchange, said transmitting means in response to an outgoing call to a private branch exchange included in the same group sending a signal to said signal receiving means in the called private branch exchange, said signal operating said receiving means in said called branch exchange and said receiving means actuating said connecting means to set up a connection between the called incoming exchange line and the subscriber's line designated by said private number.

3. In an automatic telephone network, in combination, public automatic telephone exchanges; groups of arbitrarily located private automatic branch exchanges; for each of said private automatic branch exchanges a listed number and a non-listed number in a public numbering range; junction-lines in said network interconnecting said public exchanges and a bundle of lines, which corresponds to both said numbers, connecting each private branch exchange in a group to a public exchange; a private numbering range common to all private branch exchanges in one of said groups for traffic within the group; registers in each private branch exchange in said group arranged for the registration of numbers within said private numbering range and means in said registers translating a called number pertaining to another private branch exchange in the group into said non-listed number for the bundle of lines of said other private branch exchange; transmitting means associated with said registers sending said non-listed number to the public telephone network followed by a number designating the called line in the called private branch exchange; all lines in each of said bundles of lines being connected to multiple positions of the non-listed number and also to the listed number of the bundle in a private automatic telephone exchange where the bundle terminates; means for sending different types of ring signals for calls to said non-listed number and to said listed number; for each incoming line in the private automatic branch exchange a separate ring signal receiving relay; incoming registers; an operator's position; calls to said non-listed number operating said separate relay which connects the call to one of said incoming registers for the connection of the call automatically and calls to said listed number not operating said separate relay and being connected to said operator's position.

References Cited by the Examiner

UNITED STATES PATENTS 2,867,690 1/59 Parks ------------------ 179—18

OTHER REFERENCES

Publication: "The Automatic Electric Technical Journal," vol. 4, No. 3, December 1955, pp. 93–107.

ROBERT H. ROSE, *Primary Examiner.*